US005293950A

United States Patent [19]

Marliac

[11] Patent Number: 5,293,950

[45] Date of Patent: Mar. 15, 1994

[54] OFF-HIGHWAY MOTOR VEHICLE FOR PARAPLEGIC HANDICAPPED PERSONS

[76] Inventor: Patrick Marliac, Courrance, Lacapelle-Biron 47150, France

[21] Appl. No.: 819,779

[22] Filed: Jan. 13, 1992

[30] Foreign Application Priority Data

Jan. 17, 1991 [FR] France ................................ 91 00713

[51] Int. Cl.[5] ................................ B62D 11/00

[52] U.S. Cl. ................................ 180/11; 180/241; 180/907; 414/476; 414/921

[58] Field of Search ................ 180/11, 15, 16, 241, 180/907; 280/250.1, 305.1; 414/468, 469, 476, 537, 921

[56] References Cited

U.S. PATENT DOCUMENTS

| | | | |
|---|---|---|---|
| 938,786 | 11/1909 | Palmer | 180/241 |
| 3,204,791 | 9/1965 | Williams | 414/537 |
| 3,921,740 | 11/1975 | Forster | 180/907 |
| 4,401,178 | 8/1983 | Studer | 180/9.22 |
| 5,094,314 | 3/1992 | Hayata | 414/476 |

FOREIGN PATENT DOCUMENTS

| | | |
|---|---|---|
| 0251136 | 1/1988 | European Pat. Off. . |
| 3414204 | 1/1951 | Fed. Rep. of Germany . |
| 2315254 | 1/1977 | France . |

*Primary Examiner*—Margaret A. Focarino
*Assistant Examiner*—Anne Boehler
*Attorney, Agent, or Firm*—Pearne, Gordon, McCoy & Granger

[57] ABSTRACT

The invention concerns an off-highway motor vehicle for paraplegic handicapped persons. It comprises a frame (1) whose base (1') has a U shape open towards the front, the paraplegic sitting on his wheelchair (3) being installed between the branches of the frame. The branches of the U are extended by two box plate girders (2) rotary-joined onto the frame and each including two wheels (8). The vehicle comprises a tubular frame (4) cooperating with two shoes (5) for embarking, disembarking, and storing away the wheelchair. The frame and shoes are rotary-joined (B,C) to the frame and interconnected by a rocker bar (6). A kinematic chain transmits the movement of the drive train (7) to four driving wheels (8). The controls of the drive train and of the vehicle are provided on the frame (4).

9 Claims, 6 Drawing Sheets

OFF-HIGHWAY MOTOR VEHICLE FOR PARAPLEGIC HANDICAPPED PERSONS

FIELD OF THE INVENTION

The present invention concerns an off-highway vehicle for paraplegic handicapped persons.

BACKGROUND OF THE INVENTION

The invention is applicable to paraplegic handicapped persons normally moving around in a wheelchair and desiring, without making use of any external assistance and leaving their wheelchair, of using a motorized vehicle able to move around on uneven terrain.

There are a large number of adapted wheelchairs ranging from a simple motorized device to tracked wheelchairs moving on flat terrain and making it possible to overcome obstacles, such as flights of stairs (FR-A. 2.590 162) and indeed motorized systems able to tow the wheelchair (FR-A. 2.252 080).

There currently exist devices for transferring the handicapped person seated on his wheelchair, either with slides and a lifting block (FR-A. 2.456.002) or by means of a door folded down to the level of the external ground surface and then lifted up to the level of the floor by means of jacks (FR.A 2.506.154).

All these embodiments have a large number of drawbacks, either by virtue of their complexity or because they do not allow the paraplegic to be fully self-sufficient or because they cannot be used on uneven terrain. Moreover, there are vehicles designed for paraplegics allowing them to be used completely autonomously without the handicapped person having to leave his wheelchair. Loading is generally effected via the rear or by means of an articulated floor board forming a slanted plane (ER-0.251.136) by means of a mobile floor board lowered to ground level (FR-A- 2.315.254 - FR-A-2.521.500) and then brought up into the driving position by means of jacks. The car interior is fitted in such a way that the handicapped person, seated on his wheelchair stowed on the floor, is able to drive the vehicle.

However, these vehicles, most frequently saloon type vehicles, comprise complex mechanisms provided for movements on roads and are unsuitable for being used on uneven terrain.

SUMMARY OF THE INVENTION

The object of the present invention is to provide an off-highway motor vehicle overcoming the drawbacks of the prior art, as mentioned above.

According to the invention, its use is entirely autonomous and the paraplegic handicapped person remains in his wheelchair, both when embarked into the vehicle, when using it and when disembarking.

The placing of the wheelchair in the vehicle is easily effected via the front of the vehicle and is stowed almost automatically by means of a simple manoeuvre of the balanced tubular frame.

The use of light tubular elements allied to four driving wheels with a small diameter makes it possible to lower the center of gravity of the vehicle providing it with good stability on uneven terrain, the controls of the drive train and of the vehicle disposed on each side of the wheelchair facilitating driving of the vehicle. All these elements need to be robust, reliable with ease of access and offer easy maintenance.

Finally, the advantages listed above are obtained without the need for excessive complexity.

These characteristics are obtained in accordance with the invention due to the fact that the motor vehicle, intended for a paraplegic handicapped person seated on his wheelchair allowing it to be used without any need for external aid, is characterized in that it includes a combination of:

a frame embodied in two sections, one being tubular forming a vertical small arch ended by a U-shaped base open towards the front, the other section being constituted by two box plate girders extending the branches of the U between which the paraplegic seated on his wheelchair is to be installed.

a unit comprising two elements cooperating together so as to load, stow and unload the wheelchair in the vehicle, one element being constituted by a small arch-shaped tubular frame and the other by two shoes, these two elements being rotary-joined to the frame and linked together by two rocker bars.

an endless chain transmission for transmitting the movement of the drive train placed at the rear on the axis of the tubular chassis to the four driving wheels secured to the box plate girders.

controls allowing for the starting, stoppage and driving of the drive train and of the vehicle.

By means of these elements and their disposition, the paraplegic seated on his wheelchair is fully self-sufficient. He is thus able to install himself inside the vehicle, get out of it, start the drive train and drive the vehicle in good safety conditions, despite the fact that the terrain is uneven. In addition, the endless chain transmission conventionally comprises, along with a mechanical gearbox, a centrifugal clutch, a differential gear, cardan drives, belts and chains, but may be embodied with the aid of an automatic gearbox instead of the mechanical gearbox and centrifugal clutch. Starting of the drive train is effected by any suitable device, with a manual or an electric launcher.

Preferably, the two box plate girders forming a sealed housing for transmitting the movement to the four driving wheels are each joined around an axis secured to the chassis and rotary-limited by an elastic suspension linking the tubular chassis to the girders.

This characteristic makes it possible to obtain a suspension of the four independent wheels two by two, which makes it much easier to drive the vehicle on rugged terrain.

According to one preferred embodiment, the tubular chassis forming a fender and used as a lever to activate the two shoes is kept in any position with respect to the chassis by means of an adustable immobilization device disposed on each side of the tubular chassis.

This adjustable immobilization device is made up of a rod sliding inside a cylinder and braked by a clamp type arching lever system with flanges and a spring whose control is brought back on each side of the tubular chassis to within range of the hand of the driver.

By virtue of these characteristics, the tubular frame may be positioned with respect to the chassis depending on the type or diameter of the wheels used on the vehicle or according to the profile of the terrain on which it moves. In fact, it may be advantageous during moving to modify ground clearance of the vehicle.

Preferably, the rocker bars linking the tubular frame to the shoes are adjustable according to the diameter of the wheels of the vehicle so that the inlet of the shoes forming a slanted plane is level with the ground in a low position so as to facilitate rear moving access of the wheelchair.

The immobilization of the wheelchair wheels introduced into the truncated cylindrical profile shoes is ensured longitudinally by a horizontal crossmember linking the shoes and length-adjustable according to the track of the wheelchair and laterally by two flanges disposed on both sides of each shoe.

The vertical immobilization of the wheelchair is ensured by a cylindrical crank pin secured to the internal flange of each height-adjustable shoe according to the diameter of the wheels of the wheelchair and, when resting on the rear portion of said wheelchair, prevent it from tilting forwards during the starting position placing manoeuvre obtained by tilting the tubular frame forwards.

According to these characteristics, the shoes make it possible to position, stow and lock the wheelchair on the vehicle. The adjustment systems used authorize the use of wheelchairs with variable dimensions. These adjustments are made according to the type of wheelchair prior to the first use of the vehicle.

Moreover, the invention also concerns the driving of the vehicle obtained by acting on two rotary-joined levers and disposed on both sides of the tubular frame and with one activating a turning handle acting on the drive train gases and each a braking device acting on each of the disks disposed at the drive train outlet so that a turning is made by moving the vehicle by activating a single lever and the vehicle is braked by activating the two levers at the same time.

Braking of the vehicle when parking is effected automatically by manoeuvering the tubular frame upwards when stopping which activates a braking device operating on each of the disks disposed at the outlet of the drive train.

By virtue of the simple and easily accessible dispositions of the vehicle control order devices, driving is easy and safe. The lock angle radius of the vehicle is extremely small due to the fact that the cornering of the vehicle is effected via a movement obtained by the braking of the two wheels on a given side.

In addition, when stopping, the vehicle is automatically and completely rendered immobile facilitating embarking and disembarking the wheelchair on the vehicle.

BRIEF DESCRIPTION OF THE DRAWINGS

Other characteristics and advantages of the present invention shall appear more readily from a reading of the following description of an embodiment example given by way of illustration.

DETAILED DESCRIPTION OF THE PREFERRED EMBODIMENTS

Figure 1:
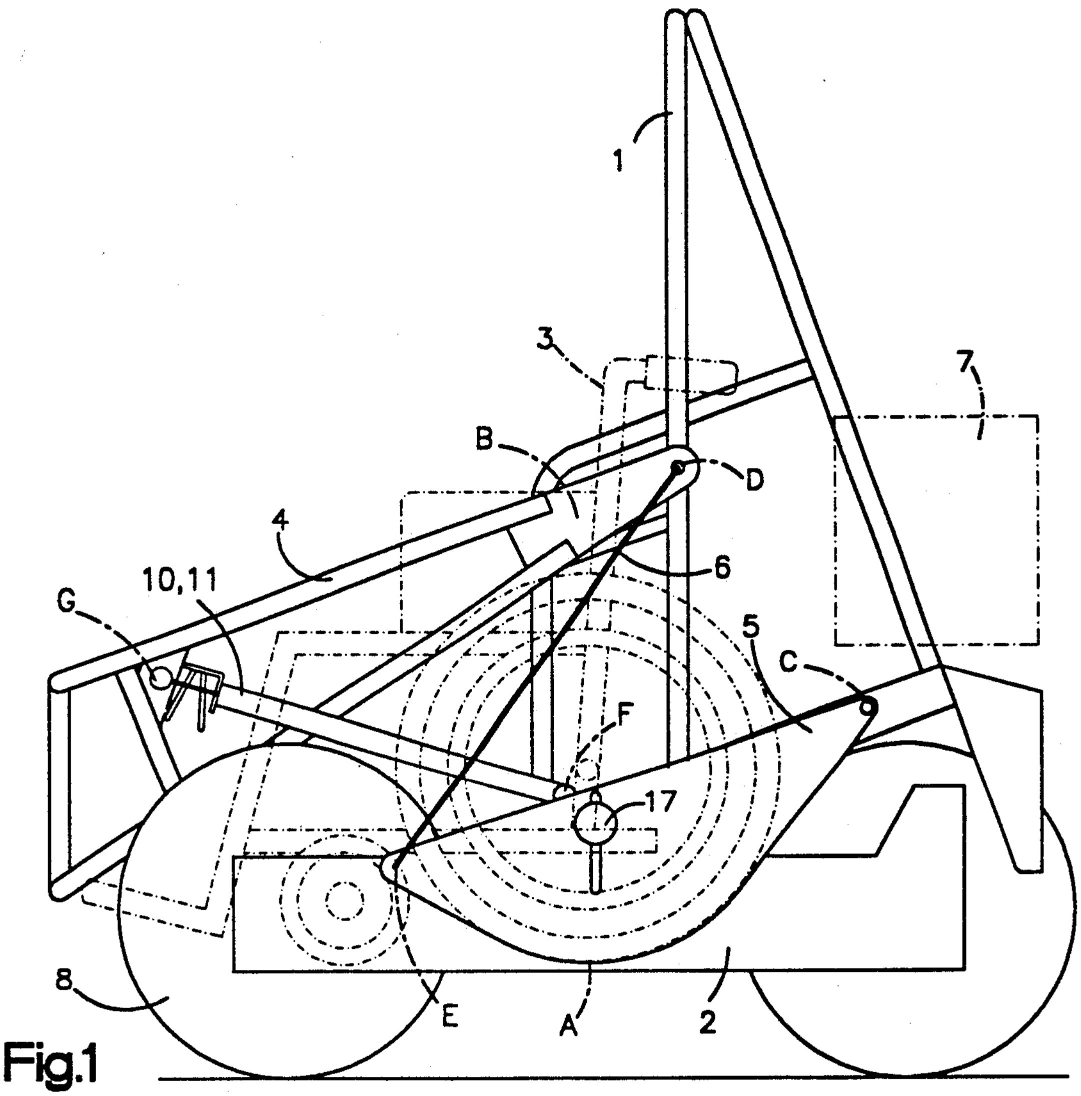
FIG. 1 is a diagrammatic transversal section of the assembly of the invention, the vehicle being in a moving position and the wheelchair being represented by the full lines.
Figure 2:
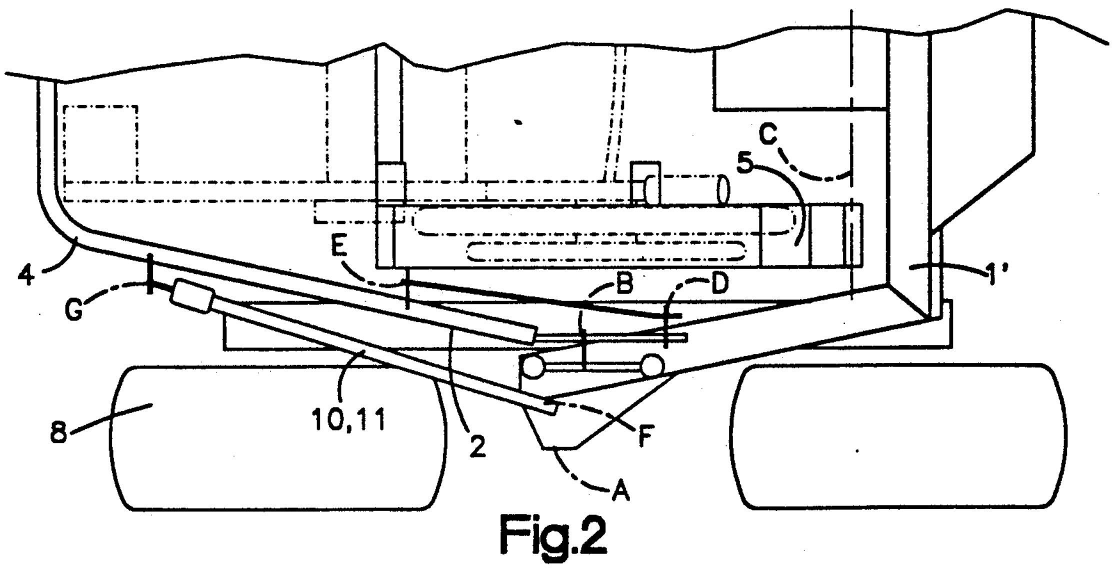
FIGS. 2 and 3 are diagrammatic half-views respectively viewed from the top and the rear, showing the positioning of the wheelchair in the chassis of the vehicle in a moving position.
Figure 3:
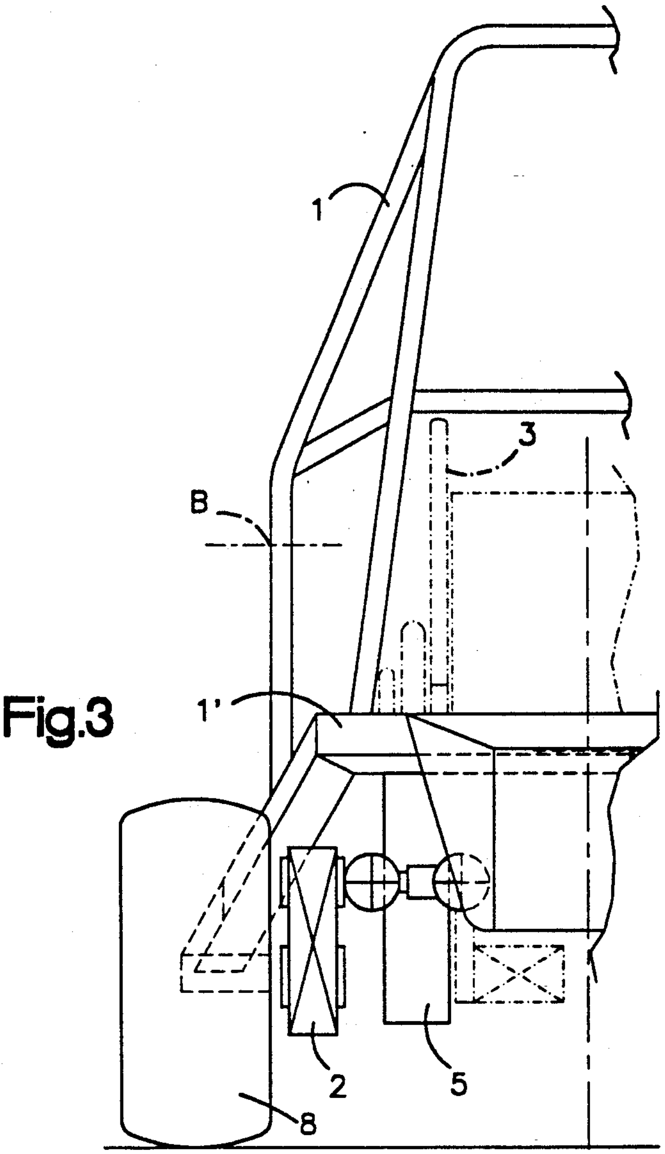

As shown on FIGS. 1 to 3, the vehicle of the invention comprises a chassis made up of two sections, one being made of steel tubes forming a vertical small arch 1 ending by a base 1' with square U-shaped profiles open towards the front, the other section being constituted by two box plate girders 2 with rectangular profiles. The various elements of the chassis are embodied by means of the welded-mechanical technique. The box plate girders 2 extending the branches of the U of the base 1' of the chassis are rotary-joined around an axis A whose fixed portion is welded to the base 1' of the chassis, the other portion rotating in a sealed elastic joint mounted on each box plate girder 2. These figures also show that the vehicle of the invention comprises a set of two elements, one being constituted by a frame 4 made of steel tubes with the shape of a small arch towards the front forming a fender, the other being constituted of two shoes 5 with a truncated cylindrical profile. These two elements are rotary-joined, that is the tubular frame 4 around an axis B with one portion welded onto the tubular chassis 1 and the other portion rotating in a bearing mounted on each side of the frame 4, the shoes 5 around an axis C with the fixed portion being welded on the shoe and the other portion rotating inside a bearing mounted on each side of the base 1' of the chassis.

These two elements cooperate with each other by means of two rocker bars with one extremity being secured at D to the frame 4 and the other at E to the shoes.

In addition, the tubular frame 4 is connected to the base 1' of the chassis by two immobilization devices 10-11 with one extremity secured at F to the base 1' of the chassis and the other at G to the tubular chassis 4. The functioning of these elements during loading, stowing and unloading of the wheelchair shall be explained later in detail.

Figure 4:
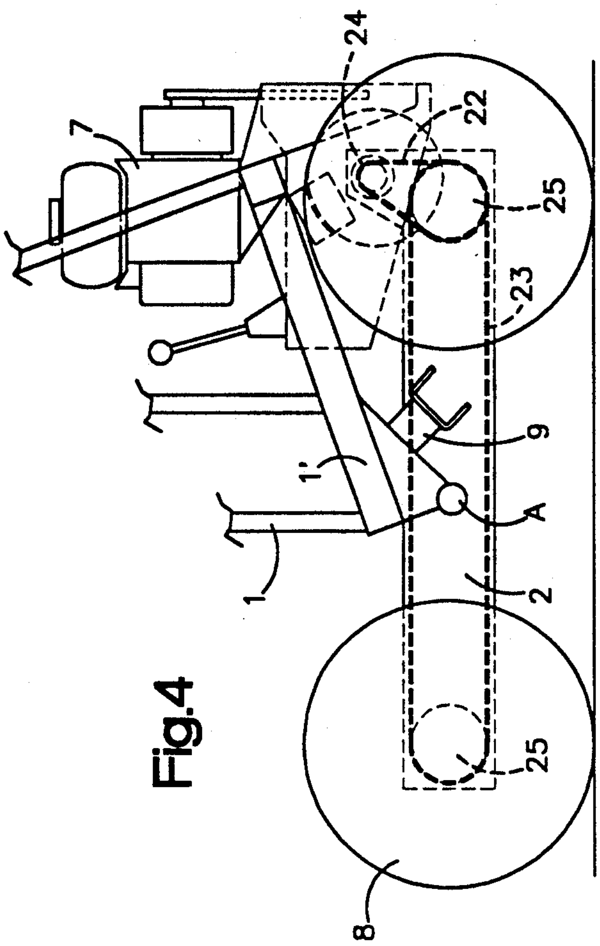
FIGS. 4, 5 and 6 are respectively diagrammatic side, top and rear views showing the kinematic chain going from the drive train to the four driving wheels.
Figure 5:
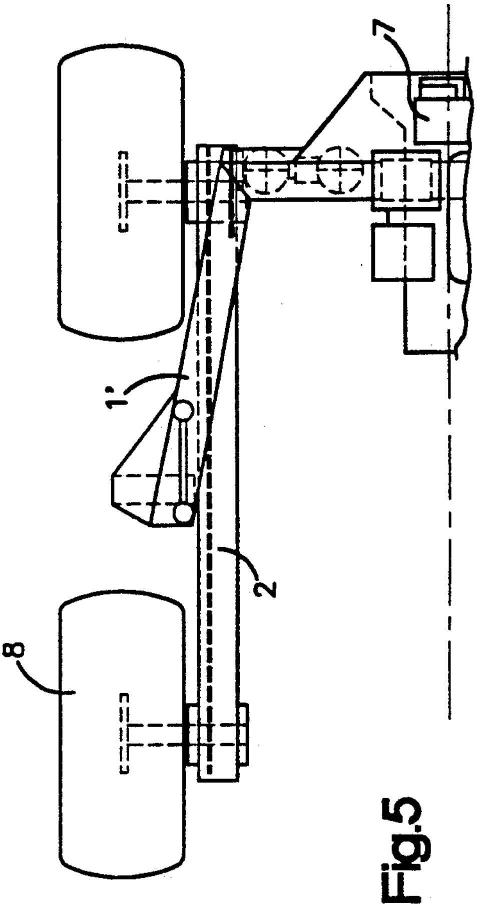
Figure 6:
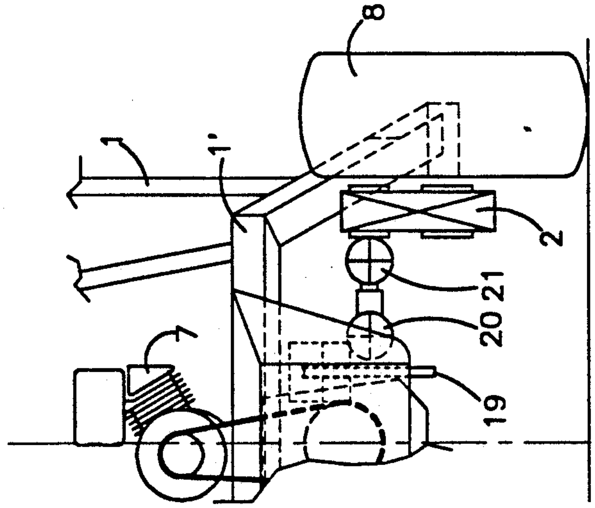

FIGS. 4 to 6 show the endless chain transmission of the vehicle of the invention. This endless chain transmission transmits the movement of the drive train 7 to the four driving wheels 8. It is composed of a small cubic capacity four stroke petrol drive train, such as the 140cm3 HONDA GX 140 stationary drive train providing a power of 3.68 KW cooled by air, equipped with its cooling fan, a petrol tank, a centrifugal clutch making it possible to start the vehicle at any speed, a four-speed mechanical gearbox plus rear start, such as the CITROEN gearbox for the two horsepower and with 2 brake disks disposed on both sides of the gearbox, cardan drive links 20-21 between the box output shaft and the inlet of the box plate girders 2 allowing for movements of these box plate girders 2 with respect to the chassis 1-1' on which the drive train 7 is mounted with a link by chains 22-23 between the pinion gears 24 and 25. The box plate girders 2 with a rectangular section are ended at the rear by a housing supporting the pinion gear 24 and transmitting the movement to the pinion gear 25 by means of the chain 22. The front and rear pinion gears 25 are interconnected by the chain 23 so that the four wheels are propulsive. The self-aligning type ball bearings are sealed.

Figure 7:
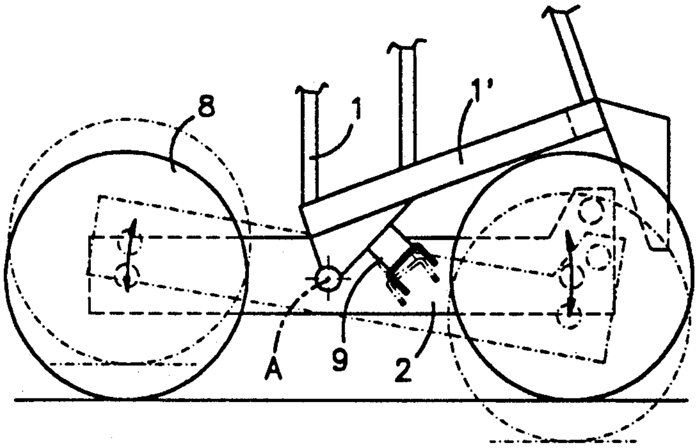
FIG. 7 is a diagrammic side view showing the device for joining and suspending the box plate girder on the chassis.

FIG. 7 shows a diagrammatic side view of the girder 2 and the base 1' of the chassis. It shows the relative movement of these two elements joined around the axis A. This movement is amplitude-limited by an elastic suspension 9 playing the role of a damper between the two elements. The full lines show the chassis 1', the box plate girder 2 equipped with its two wheels 8 and the suspension 9 in its rest position and the dot-and-dash lines show these elements in their extreme extension position.

Figure 8:
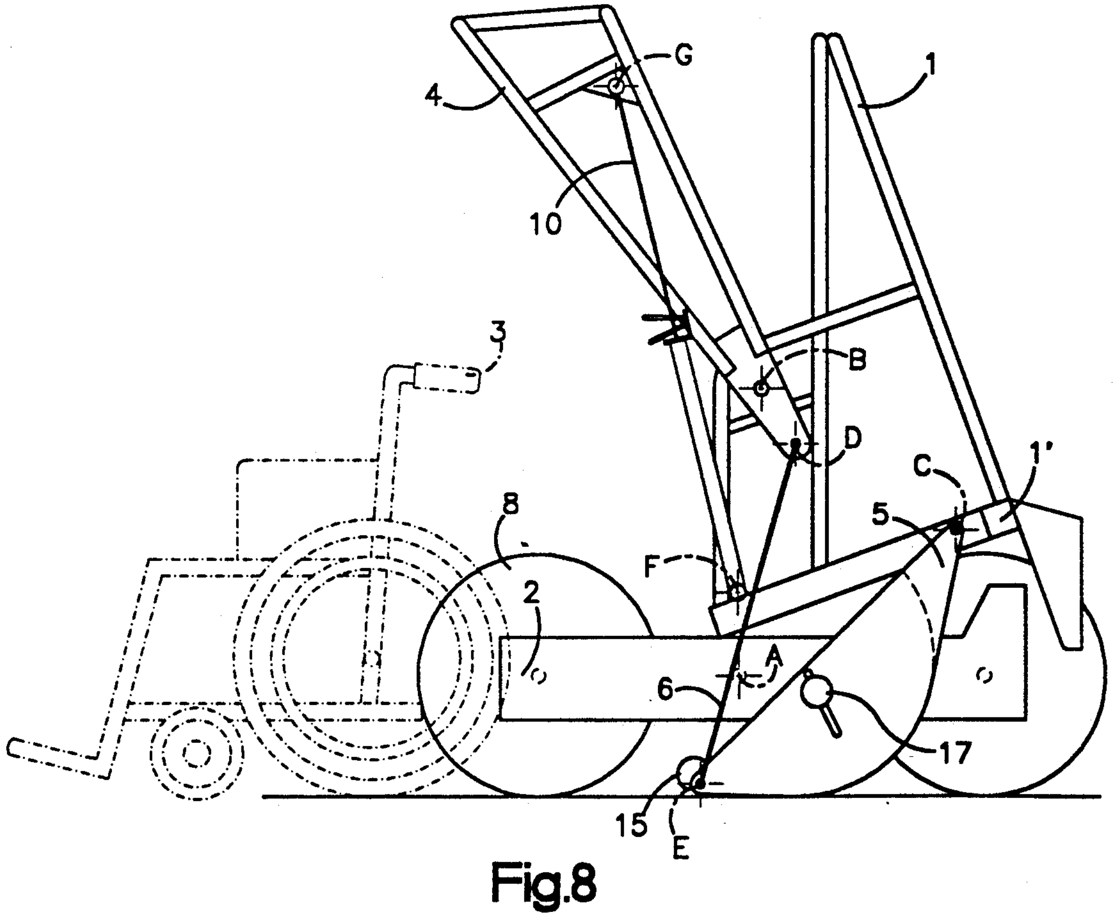

FIGS. 8 to 11 show the functioning of the devices for embarking, positioning and stowing the wheelchair in the vehicle. FIG. 8 shows a diagrammatic cutaway view of the functioning of the device for embarking the wheelchair in a low position when the vehicle stops. The wheelchair is shown by the full lines when it is ready to be placed in the vehicle. The shoe 5 rotary-joined to the base 1' of the chassis touches the ground so that the handicapped person seated on his wheelchair only has to use a slight amount of force so as to free the threshold of the shoe when moving backwards. This threshold is constituted by a horizontal crossmember 15 shown on FIG. 9 and able to be length-adjusted according to the track of the wheelchair. This adjustment is made once only prior to the first use of the vehicle. The adjustment of the position of the shoe 5 with respect to the ground is effected according to the diameter of the wheels of the vehicle by means of the length-adjustable rocker bar 6 and joined onto the shoe at E and on the tubular frame at D.

The truncated cylindrical profile with a diameter close to that of the wheelchair keeps the wheel longitudinally in position. By freeing the wheelchair from the shoe 5, this wheelchair positions the rear portion of its chassis below the cylindrical crank pin 17 made of steel and coated with Teflon. This crank pin is height-adjustable by means of a slide made on the internal flange 16 of the shoe 5, immobilization being obtained by a screw/washer/screw nut unit. This adjustment is made according to the diameter of the wheels of the wheelchair and is effected solely once prior to the first use of the vehicle.

Figure 9:
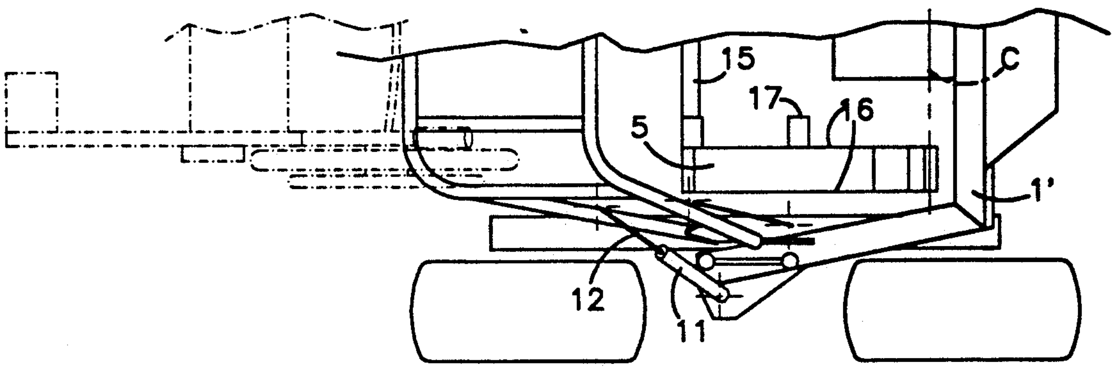
FIGS. 8 and 9 are respectively diagrammatic cutaway and top views of the device for mounting in a top position with the frame lifted up and showing the positioning of the elements when loading the wheelchair.

FIG. 9 shows a diagrammatic half-view of the top part of the device for embarking the wheelchair in a low position when the vehicle has stopped. The wheelchair is shown by the full lines when ready to be embarked. Its lateral immobilization is obtained by the flanges 16 of the shoe 5. The shoes joined to the base 1' of the chassis are interconnected by the length-adjustable crossmember 15. The rear portion of the chassis of the wheelchair slides below the Teflon crank pin 17.

Figure 10:
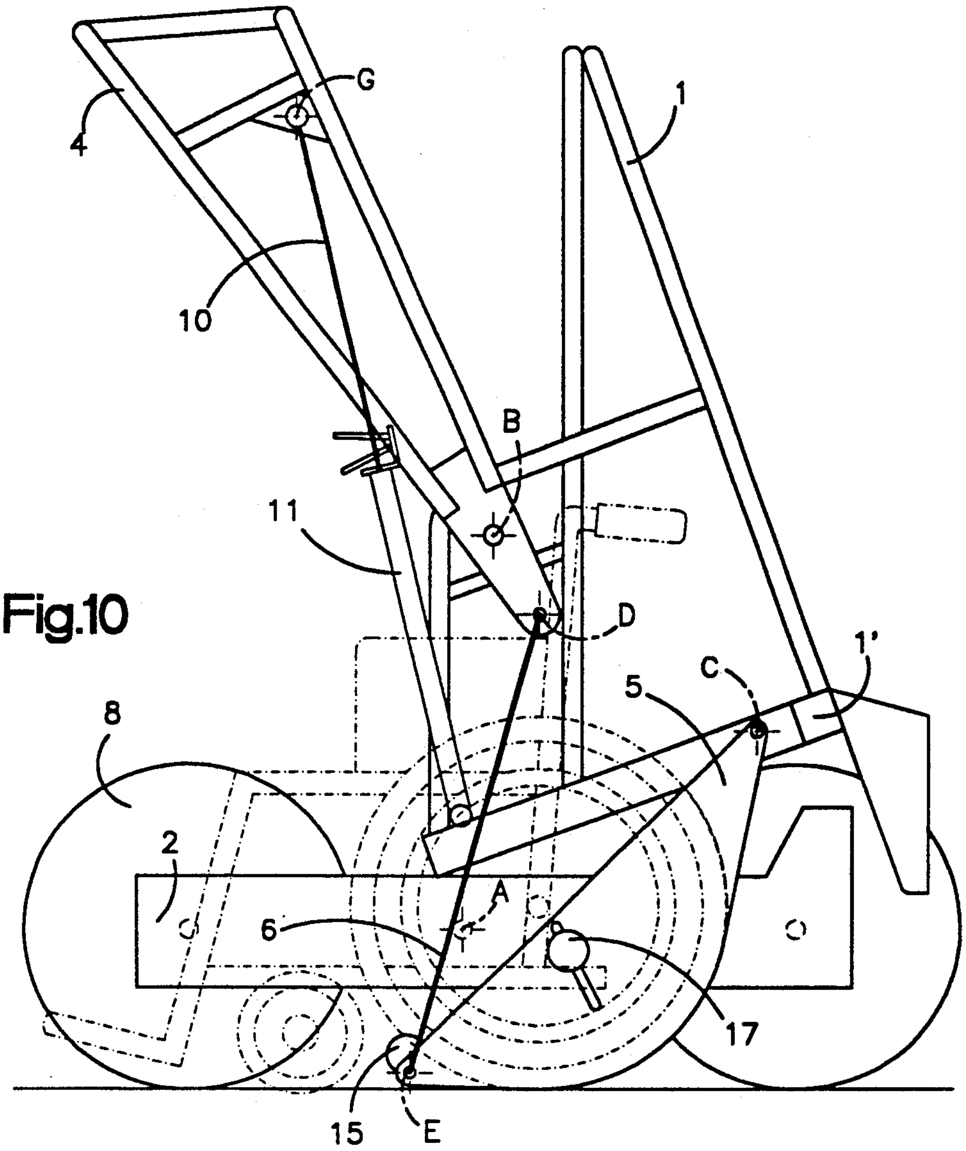
FIGS. 10 and 11 are respectively diagrammatic cutaway and top views of the device for mounting in a top position with the frame lowered and showing the positioning of the elements once the wheelchair has been loaded into the shoes.

FIG. 10 shows a diagrammatic cutaway view of the functioning of the device for embarking the wheelchair in a low position when the vehicle has stopped. From the low position shown on FIGS. 10 and 11, the top position with the vehicle in the starting position shown by FIGS. 1, 2 and 3 is obtained by tilting the tubular frame 4 forwards. This movement is effected easily by the handicapped person due to the fact that the handicapped person/wheelchair/shoe are all balanced by the tubular frame 4. In fact, the center of gravity of the tubular frame is situated towards the front by virtue of its construction. Balancing is embodied for an average weight of the handicapped person seated on his wheelchair. For weights differing from this average weight, it is possible to embody balancing by moving the axis D of the rocker bar 6 by virtue of three holes made in the frame 4 so as to increase or reduce the lever arm B D. When the wheelchair moves upwards, the crank pins 17 pressing on the rear portion of the chassis prevent the wheelchair from tilting towards the front, thus keeping it in a horizontal position embodied at the time of embarkment.

Figure 11:
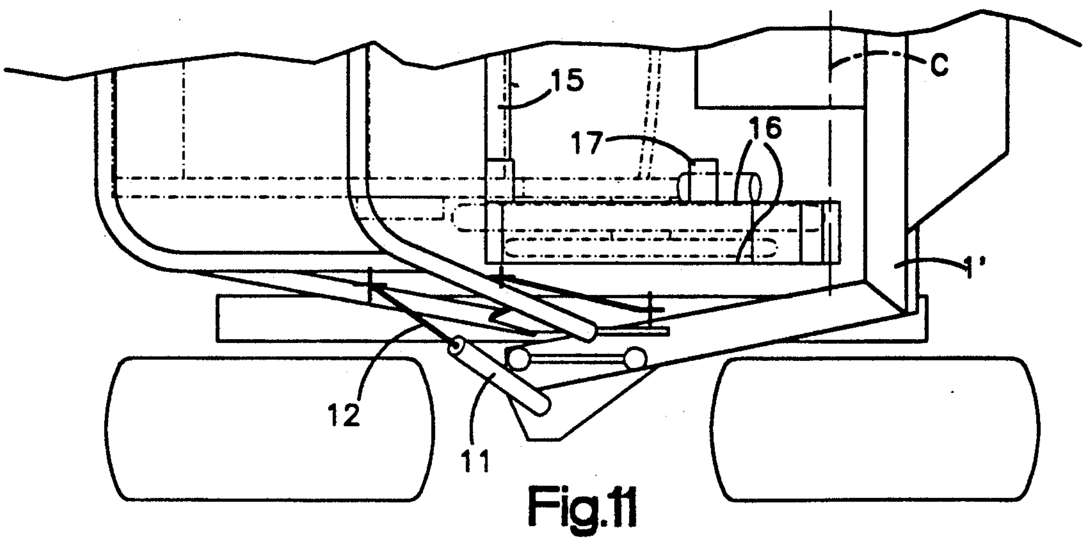

FIG. 11 shows a diagrammatic half-view of the top of the device for embarking the wheelchair in a top position when the vehicle is in the starting position. The wheelchair is shown by the full lines. Its lateral immobilization is embodied by the flanges 16 of the shoe 5, its longitudinal immobilization by the crossmember 15 resting on the wheels of the wheelchair positioned in the cylindrical profile of the shoe 5 and its vertical immobilization by the crank pin 17.

Figure 12:
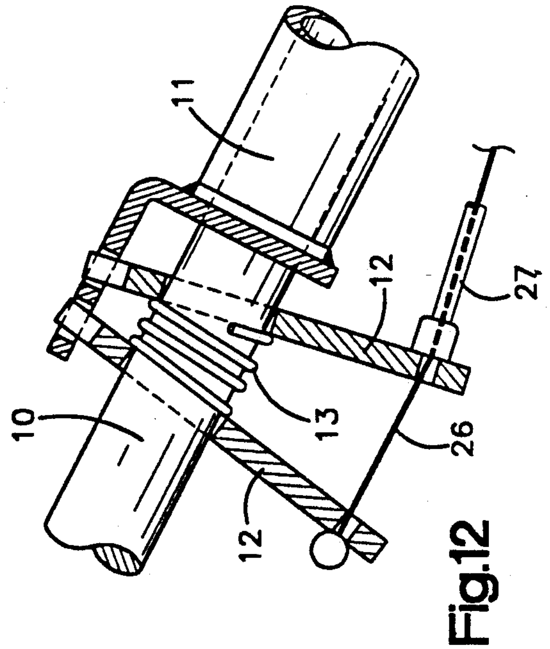
FIG. 12 is a partial large-scale view of the immobilization dvice of the tubular frame.

FIG. 12 shows a partial view on larger scale of the device for immobilizing the tubular frame 4. As seen earlier, the tubular frame 4 had mainly two top and bottom positions and this movement was obtained by the handicapped person having tilted said frame 4 rotary-joined around the axis B. Immobilization is obtained in any position by a rod 10 joined to the tubular chassis 4 at G and sliding into a cylinder 11 joined to the base 1' of the chassis at F. The rod 10 is rendered immobile by two flanges 12 and a spring 13 keeping them apart. This system functions via an arch lever in the way of a clamp. The sliding of the rod 10 inside the cylinder 11 is obtained by bringing together the two flanges with the aid of a cable 26 sliding into a sheath 27. This cable is controlled by a bicycle brake type handle 14 disposed on both sides of the tubular chassis 4 and within reach of the hands of the driver (see FIG. 13).

This immobilization system makes it possible to position the tubular frame 4 in any position ranging from the highest position to the lowest. This adjustment is particularly useful, that is in the top position according to the diameter of the wheels 8 of the vehicle so that the shoes 5 are flush with the ground, and in the bottom position according to the profile of the ground on which the vehicle moves. In fact, it may be advantageous to modify ground clearance of the vehicle by virtue of the movement of the tubular frame 4.

Figure 13:
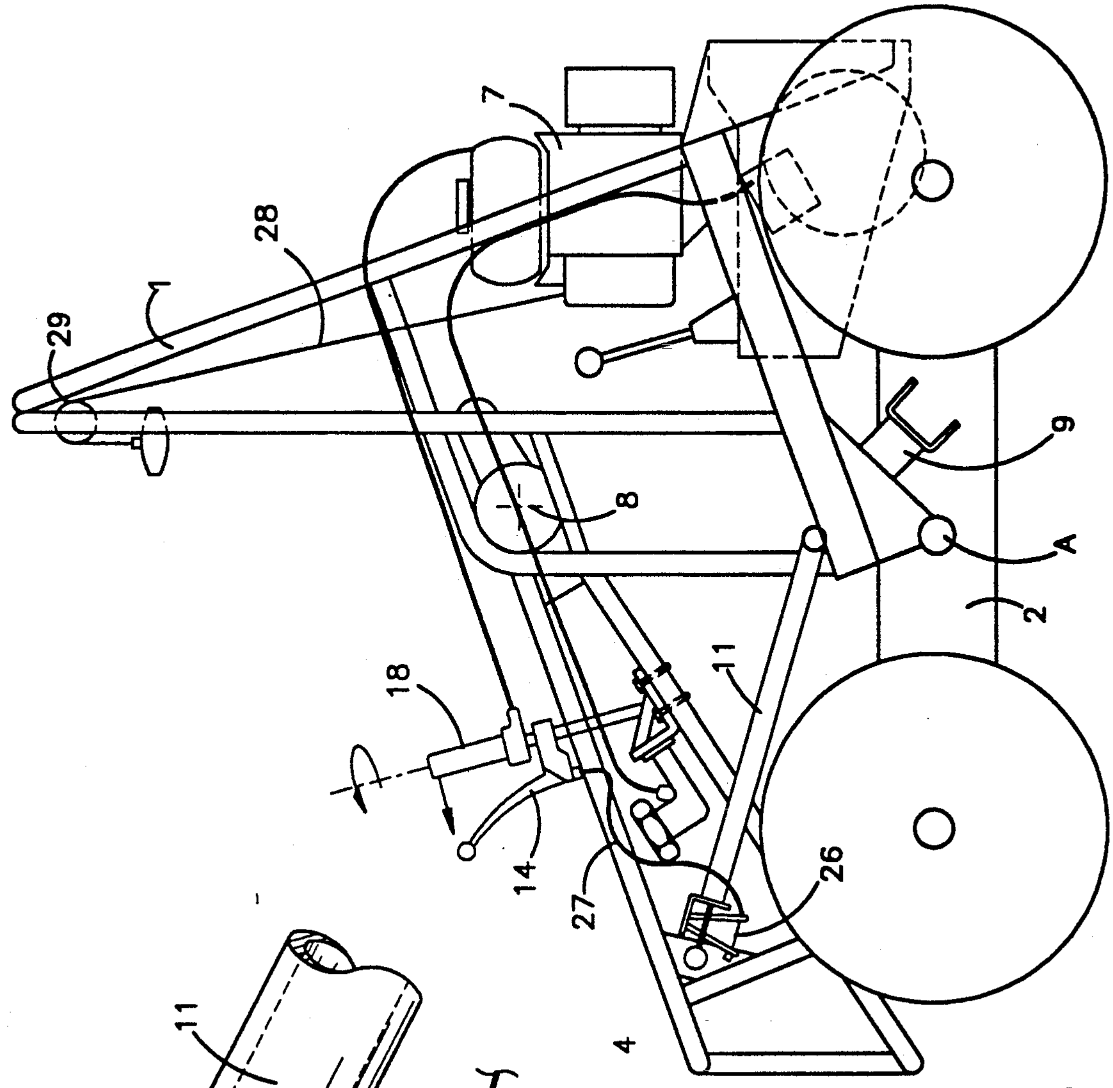
FIG. 13 is a diagrammatic side view of the vehicle showing the various orders of the drive train for embarking, disembarking and driving the vehicle.

The various controls, for embarkment, of the drive train and for driving of the vehicle are shown by FIG. 13 which is a diagrammatic side view of the vehicle. The control for immobilizing the tubular frame 4 is obtained by activating the handle 14 controlling the cable 26 in the sheath 27 enabling the rod 10 to slide into the cylinder 11. The device for starting the drive train 7 is a manual launching device whose cable 28 is brought within reach of the hand of the handicapped person by means of a pulley 29 secured to the small arch of the chassis 1 so that the normal movement from bottom to top is transformed into a top to bottom movement, which is rendered much easier for the handicapped person seated in his wheelchair.

Two handles 18 are fixed on both sides of the tubular frame 4, one being free in rotation on its axis forming a gas handle, the two handles forming rear/front rotary-joined levers with respect to the tubular frame 4. These levers 18 activate CITROEN type master brake cylinders transmitting the movement to a CITROEN type plate-clamp braking system acting on the disks disposed at the gearbox outlet. Each lever/master cylinder unit is flanged to the tubular frame 4 and is able to slide, thus allowing for a longitudinal adjustment according to the morphology of the driver.

By acting on the left lever, the two left wheels are braked, the right wheels not being braked and the vehicle functions by activating a turning towards the left. By simultaneously activating the left and right levers 18, the vehicle is braked until it stops, if required.

Moreover, a device, not shown on FIG. 13, makes it possible to brake the vehicle when parking. A cable sliding into a sheath activates a plate-clamp braking device disposed on the two disks at the gearbox outlet. The cable is secured to the chassis 1', the sheath to one of the shoes 5, the relative movement of the shoe 5 with respect to the chassis 1' making it possible to embody this braking when the tubular frame 4 is lifted into the top position. Therefore, the vehicle is automatically braked on stopping, which in particular has the advantage of keeping the vehicle immobile when the wheelchair is placed on or off the vehicle, thus facilitating the manoeuvre.

The invention clearly is able to attain the above-mentioned aims: the use of an off-highway motor vehicle by a paraplegic handicapped person without requiring any external assistance or having to leave his wheelchair.

The paraplegic handicapped person is not merely self-sufficient but does not need to exert significant force in order to get into the vehicle, get out of it, stow it, start the drive train and drive the vehicle.

There is a large amount of accessibility of all the devices so that the handicapped person is able to himself carry out minor maintenance operations.

In addition, the design of the vehicle with two-by-two four driving wheels and independent suspension allied with extremely easy driving render this vehicle extremely safe, even on uneven terrain and thus constitute the main advantage of the present invention.

Embodiment variants (not shown) of the vehicle would in particular make it possible to use a motorized wheelchair.

In addition, the vehicle of the invention is able to tow self-propelled tools, such as a demister. For intensive use, it is advisable to insert a more powerful engine on the vehicle, such as the HONDA 240 cm3 engine. For any long trips, the vehicle may be placed on a light trailer and disembarked when it is used on uneven terrain.

The present invention is thus not merely limited to the single embodiment example described above.

What is claimed is:

1. Off-highway vehicle for a paraplegic handicapped person seated on his wheelchair and enabling the wheelchair to be used without the need for external aid, wherein the vehicle includes a combination of: a chassis comprising first and second portions, said first portion being tubular and forming a vertical arch ended by a U-shaped base open toward a front of the chassis, the second portion comprising two box plate girders extending branches of the U-shaped base between which the person seated in his wheelchair is installed, a unit comprising two elements cooperating together for loading, stowing, and unloading of the wheelchair in the vehicle, one element being an arch-shaped tubular frame and the other element comprising two shoes, these two elements being rotary-joined to the chassis and interconnected by two rocker bars, an endless chain transmission transmitting movement from two outlets of a power drive train respectively, to two pairs of driving wheels, each pair of driving wheels being secured to one of the two box plate girders, control means to start, stop, and control the drive train and drive the vehicle, and a braking device comprising two levers which respectively operate on one of two disks, each of said disks being disposed at one of the two drive train outlets so that the vehicle turns in a direction corresponding to the pair of wheels braked by activation of the lever acting on this pair of wheels, braking of the vehicle being obtained by simultaneously activating the two levers.

2. A vehicle according to claim 1, wherein the two box plate girders form a sealed housing for transmitting movement to the two pairs of driving wheels, said girders each being joined around an axis secured to the chassis and rotary-limited by an elastic suspension linking the tubular chassis to the girders.

3. A vehicle according to claim 1, wherein the tubular frame forms a fender and is used as a lever to activate the two shoes, said tubular frame being kept in any position with respect to the chassis by means of an adjustable immobilization device disposed on each side of the tubular frame.

4. A vehicle according to claim 3, wherein the adjustable immobilization device comprises a rod which slides into a cylinder and is braked by a clamp arch lever system with flanges and a spring whose control is brought back on each side of the tubular frame within reach of the person seated in the wheelchair.

5. A vehicle according to any one of claims 1 to 3, wherein the rocker bars linking the tubular frame to the shoes are adjustable in accordance with a diameter of the wheels of the vehicle so that an inlet of the shoes forming an inclined plane are flush with ground in a low position to facilitate rear working access of the wheelchair.

6. A vehicle according to any one of claims 1, 2, or 3, wherein immobilization of the wheels of the wheelchair introduced into the shoes with a truncated cylindrical profile is ensured, firstly longitudinally by a horizontal crossmember linking the shoes and being length-adjustable according to a track of the wheelchair, and laterally by two flanges disposed on both sides of each shoe.

7. A vehicle according to any one of claims 1, 2, or 3, wherein vertical immobilization of the wheelchair is provided by a cylindrical crank pin secured to an internal flange of each of the height-adjustable shoes, said crank pin being secured to the flange in accordance with a diameter of the wheels of the wheelchair and coming to rest on a rear portion of said wheelchair, thus preventing the wheelchair from tilting forwards during a starting position placing manoeuvre obtained by tilting the tubular frame forward.

8. A vehicle according to claim 1 or 2, wherein one of the two levers comprises a rotating handle acting on the power of the drive train.

9. A vehicle according to claims 1, 2 or 3, wherein braking of the vehicle when parking is embodied automatically by manoeuvering on stopping the tubular frame upwards which activates the braking device operating on each of the disks disposed at the drive train outlet.

* * * * *